(12) United States Patent
Tiphane

(10) Patent No.: US 6,680,677 B1
(45) Date of Patent: Jan. 20, 2004

(54) PROXIMITY DETECTOR TO INDICATE FUNCTION OF A KEY

(75) Inventor: Guy Tiphane, Atherton, CA (US)

(73) Assignee: Logitech Europe S.A. (CH)

( * ) Notice: Subject to any disclaimer, the term of this patent is extended or adjusted under 35 U.S.C. 154(b) by 450 days.

(21) Appl. No.: 09/684,109

(22) Filed: Oct. 6, 2000

(51) Int. Cl.[7] .................. H03K 17/94; H03M 11/00
(52) U.S. Cl. .................. 341/22; 341/34; 400/491.3; 400/712
(58) Field of Search .................. 341/22, 34; 400/491.3, 400/712

(56) References Cited

U.S. PATENT DOCUMENTS

| | | | |
|---|---|---|---|
| 5,311,175 A | * 5/1994 | Waldman | 341/34 |
| 5,786,811 A | 7/1998 | Jaeger | 345/172 |
| 5,844,506 A | 12/1998 | Binstead | 341/34 |
| 6,067,074 A | 5/2000 | Lueders | 345/156 |
| 6,088,516 A | 7/2000 | Kreisel et al. | 395/200.51 |

\* cited by examiner

*Primary Examiner*—Timothy Edwards
(74) *Attorney, Agent, or Firm*—Townsend and Townsend and Crew LLP

(57) ABSTRACT

An input device with a user-selectable key that includes a proximity detector associated with the key. The proximity detector detects the proximity or touch of a user's finger and provides user feedback related to the function of the key, without actually activating the function of the key. This allows a user to determine what a particular key on a keyboard or other device will do by simply hovering the user's finger near the top of the key, or lightly touching the key without depressing it.

4 Claims, 3 Drawing Sheets

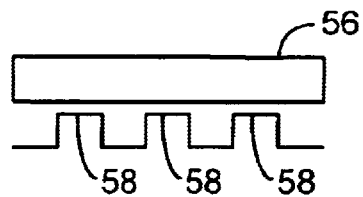
FIG. 3
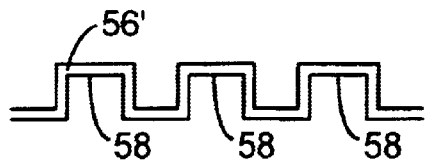
FIG. 4
LUT
| BUTTON | FUNCTION | EVENTS |
|--------|----------|--------|
| 1 | A<br>B | 1<br>2<br>3 |
| 2 | C<br>D | 1<br>2<br>3 |
| 3 | | |
| 4 | | |
| 5 | | |
FIG. 5

PROXIMITY DETECTOR TO INDICATE FUNCTION OF A KEY

BACKGROUND OF THE INVENTION

The present invention relates to keys on input devices, such as keyboards, and in particular to indicating the function of such a key.

Various types of keys or buttons exist on a variety of input devices. A typical keyboard has depressible keys for typing letters or numbers or functions. A mouse will typically have multiple keys and a roller. Trackballs, joysticks, personal digital assistants, game pads, and other devices also include keys. In addition to keys which are depressed, touchscreen keyboards react to the touch of a user's finger. These can actually be in the display itself, or a separate keyboard. Touchpads provide a mouse-like function, and also allow tapping to simulate a keypress. In one example of a touchpad, a keypad array is provided which cannot only be activated by touch, but also by the proximity of a finger to a position on a keypad. This is set forth in U.S. Pat. No. 5,844,506.

The indication of the function of a key is typically done by a letter written on the top of the key or to its side. Some keys may have graphics, or multiple functions indicated, with the selection being done by a shift key or other control key. Templates are provided with some keyboards to put around the function keys to indicate their function for a particular program. One difficulty with keys is that sometimes the function of the key can vary, or it can be user programed, making the indication of the key function on the key difficult. One approach to solving this is set forth in U.S. Pat. No. 5,786,811, which essentially provides a small display on the top of each key. This display can be dynamically modified in accordance with changing functions of the key. On a touchscreen, this is more easily done since the display itself allows the indication of the function of the touchscreen button. Where a mouse is used and keys on the toolbar or otherwise are activated, this is also more easily labeled with icons or words which can be displayed on the display. In addition, where an icon is used, it is common practice for a pop-up display to indicate the function in words of that key when the mouse cursor comes to rest on it, before it is clicked. U.S. Pat. No. 6,067,074 shows a flexible display membrane over pressure-responsive switches. The display memory shows the functions of the switches, and can be updated.

An additional function of some input devices is to provide a signal from the computer or elsewhere back to the input device. One example is a pager which can light up or vibrate when a message is received. Telephone sets commonly have an LED next to a button indicating the presence of a voice message or the use of a particular line. Some keyboards have a single key e-mail access. In addition, a keyboard may have an LED which indicates the receipt of e-mail by lighting up the LED. See, for example, U.S. Pat. No. 6,088,516.

SUMMARY OF THE INVENTION

The present invention provides an input device with a user-selectable key that includes a proximity detector associated with the key. The proximity detector detects the proximity or touch of a user's finger and provides user feedback related to the function of the key, without actually activating the function of the key. This allows a user to determine what a particular key on a keyboard or other device will do by simply hovering the user's finger near the top of the key, or lightly touching the key without depressing it.

In one embodiment, the function of the key is indicated by a small LCD or other display on a keyboard or other input device. Alternately, a small window on a computer display may be used. In yet another embodiment, the speaker of a computer can provide an audible indication of the key function, which would especially be useful for blind users.

In one embodiment, the key can be responsive to an external event, such as the receipt of e-mail or the receipt of data of a certain type from a website, such as a change in a stock price. The function activated by pressing the button can vary depending upon the event received, e-mail or stock price (e.g., access email with the button, or access web site for stock trading). The proximity detector would provide a user feedback, such as on a display, which lets the user know what event has been received.

In another aspect of the invention, the proximity detection can be used to add a separate functionality to the key, different from actually depressing the key. This would be analogous to the different functionality when a shift key is used, or from a click or double click of a mouse key, for example.

For a further understanding of the nature and advantages of the invention, reference should be made to the following description taken in conjunction with the accompanying drawings.

BRIEF DESCRIPTION OF THE DRAWINGS

FIGS. 3 and 4 are diagrams of embodiments of a keys with combination touchpad/proximity detection and depressible keys.

FIG. 5 is a diagram of a lookup table for associating particular keys with particular functions or events.

DESCRIPTION OF THE SPECIFIC EMBODIMENTS

Figure 1:
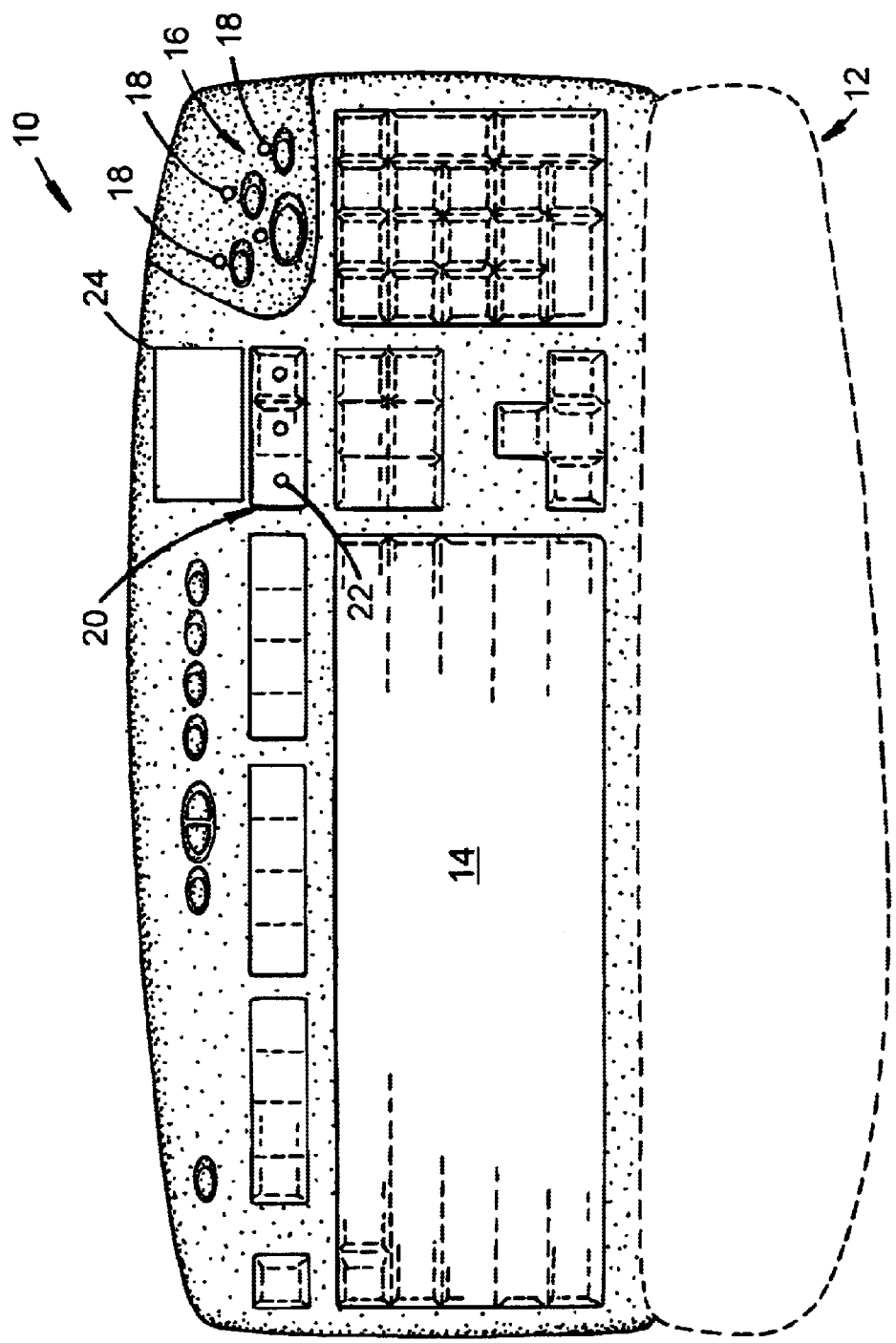
FIG. 1 is a diagram of a computer keyboard incorporating an embodiment of the invention including an LCD display.

FIG. 1 is a diagram of a keyboard 10 which can be used with a wrist support 12. The keyboard includes a key array 14 as well as other groups of buttons. Four buttons in a group 16 each include an LED 18 adjacent the buttons. Buttons in group 20 each include an LED 22 on the button itself. These LEDs can be used to provide the indication of an external event, prompting the user to activate the button. Also shown is a small liquid crystal display (LCD) 24 on the keyboard.

In the embodiment of FIG. 1, each of the keys on keyboard 10, or a sub-group of the keys, such as group 16 or 20, includes proximity detectors. When a user's finger is adjacent to the key, this is detected and information about the function of the key can be displayed on display 24. Thus, a user can investigate the meaning of a key or button before pressing it. This is especially significant when the meaning of the button can change due to external events, such as Internet events. For the buttons containing an LED in groups 16 and 20, the external event changes the state of the LED to tell the user of an event. Since many different events can occur that would affect the LED state, by the user placing his/her finger near or lightly on the button, the particular event can be described. This can save the user significant time by allowing the user to decide whether or not to proceed with the event.

For example, the event may be the indication of an e-mail message which the user may decide to defer, rather than pushing the button and causing the screen to take some time to shift to the e-mail program. Likewise, an event such as a change in a stock price or a baseball score can be indicated by an LED lighting up. The user noticing this can decide whether he/she wants to activate the browser to go to the stock trading program, etc.

Figure 2:
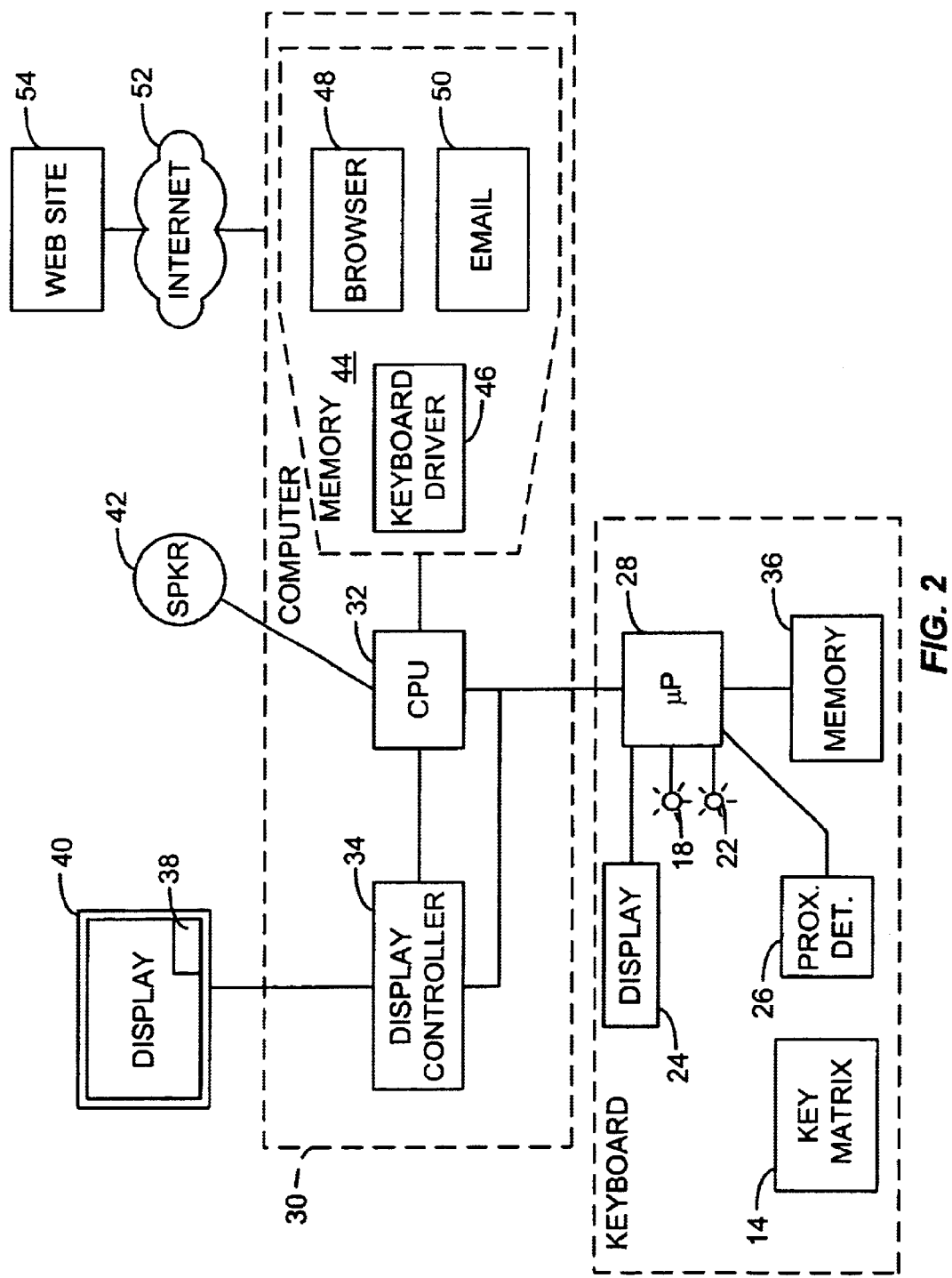
FIG. 2 is a block diagram of a computer system showing the major elements of a keyboard and the associated computer for implementing the present invention.

FIG. 2 is a block diagram illustrating the major components of the invention. Shown is keyboard 10 along with display 24 and LEDs 18 and 22. Also shown is the key matrix 14. A proximity detection circuit 26 detects when a finger is adjacent any one of the keys in key matrix 14, or other keys. One example of a proximity detection using capacitive detection is set forth in U.S. Pat. No. 5,844,506, the disclosure of which is incorporated herein by reference.

Keyboard 10 also has a microprocessor or other controller 28 which controls the overall operation of the keyboard and provides keytouch signals to a computer 30. Computer 30 includes a CPU 32 as well as a display controller 34. Microprocessor 28 can cause a function or event to be displayed on display 24 of the keyboard based on its local storage in a memory 36 of the keyboard functions or events. Alternately, it can provide instructions to display controller 34 to display a small window 38 on a computer display 40. Window 38 can then provide the function of whatever key the user has his/her finger in contact with or over.

The user feedback can alternately be provided through a speaker 42. A memory 44 in computer 30 can contain the keyboard driver software 46, which provides the controls for responding to proximity detection signals forwarded from the keyboard microprocessor 28 in one embodiment. The driver can also coordinate the display of event information on display 24 or display window 38. Keyboard driver 46 can also manage a memory in the computer 30, or memory 36 in keyboard, which stores a lookup table of the buttons and their associated functions or events, as described with respect to FIG. 5 below.

Keyboard driver 46 can also interface with a browser program 48 or an e-mail program 50 to periodically inquire about desired user events through the Internet 52 to website (s) 54. On the occurrence of certain trigger events as set by the user, event data can be stored in a lookup table with respect to a particular button, and, if applicable, an LED associated with that button can be illuminated by appropriate instructions sent back to the keyboard.

FIG. 3 illustrates one embodiment of the keyboard matrix incorporating both a button press capability and proximity sensing. A touchpad layer 56 is mounted above a series of depressible keys 58. The touchpad layer 56 is flexible enough so that it can be depressed above one of the keys and only depress that key below it. The grids in the touchpad for determining the location of a finger can be aligned with the underlying keys. The touchpad can be constructed as described in U.S. Pat. No. 5,844,506, referenced above. The touchpad can be a flexible membrane such as disclosed in U.S. Pat. No. 6,067,074, referenced above.

An alternate approach is shown in FIG. 4, in which a touchpad layer 56' is molded around each key, rather than being mounted as a flat sheet across all of the keys.

FIG. 5 illustrates a lookup table which can be stored in a memory in the computer or the keyboard for storing the association of functions to particular keys or buttons. The first row indicates a number corresponding to the ID of a particular key on the keyboard. The second column sets forth a function(s) of that key. The function can be modified by appropriate rewriting of this table. In addition, when events occur, they can be written into the table associated with the particular key by a pointer or otherwise.

In one embodiment, keys may have multiple functions, such as is on a standard keyboard in which one function occurs upon pressing the key, and another function occurs upon pressing the shift key and the key at the same time. By a user having one finger hover over the shift key, and a second finger hover over the other key, the alternate function can be displayed. When the finger is removed from the shift key, instead the function without the shift key is displayed. Other combinations of keys can provide multiple functions in this manner as well. Thus, the lookup table of FIG. 5 could have multiple functions listed for each of the buttons, or could have a separate column indicating different combinations of buttons corresponding to different functions.

In one embodiment, the invention is applied to a display screen with touch activated buttons on the screen. Current technology can detect the proximity or light touch of the user and activate the function of the button. In an embodiment of the invention, the proximity of a finger would not activate the button, but instead would cause its function to display. The actual touching of the touchscreen would cause the function to be executed. Alternately, the button could have a first function executed on the proximity of the finger, and a second function executed upon actual touching by the finger. In another embodiment, light touching can activate a first function, instead of displaying it, while pressing the button activates a second function.

Although a capacitive proximity detection has been described, other types of proximity detection can be implemented. The detection mechanism can be photosensitive or electrical, for example.

The present invention can also be applied to other devices having keys, not just a keyboard. For example, the keys on a joystick, gamepad, personal digital assistant, or any other peripheral device could have the present invention applied to it.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. An input device comprising:
   a user-selectable key;
   a proximity detector associated with said key for detecting the proximity of a user's finger to said key and generating a proximity signal;
   a user feedback device;
   a controller, responsive to said proximity signal, for providing information through said user feedback device related to a function of said key, without activating said function of said key;
   an indicator associated with said key; and
   said controller activating said indicator in response to a received, external event associated with said function of said key.

2. An input device comprising:
   a user-selectable key;
   a proximity detector associated with said key for detecting the proximity of a user's finger to said key and generating a proximity signal;
   a user feedback device;
   a controller, responsive to said proximity signal, for providing information through said user feedback device related to a function of said key, without activating said function of said key;

wherein said proximity signal activates a first function, causing a function, beyond identification of said key or a function, to be executed, and a depressing of said key activates a second function.

3. An input device comprising:

a user-selectable key;

a proximity detector associated with said key for detecting the proximity of a user's finger to said key and generating a proximity signal;

a user feedback device;

a controller, responsive to said proximity signal, for providing information through said user feedback device related to a function of said key, without activating said function of said key;

wherein said information is an external event received over a computer network.

4. An input device comprising:

a user-selectable key;

a proximity detector associated with said key for detecting the proximity of a user's finger to said key and generating a proximity signal; and a controller, responsive to said proximity signal, for taking an action different from an action taken upon touching or depressing said key and other than identifying said key or actions.

* * * * *